July 16, 1940.  C. S. BROWN  2,207,780
MOTOR DRIVEN VEHICLE
Filed April 1, 1938  3 Sheets-Sheet 2

INVENTOR.
Charles S. Brown.
BY Bedell Thompson.
ATTORNEYS.

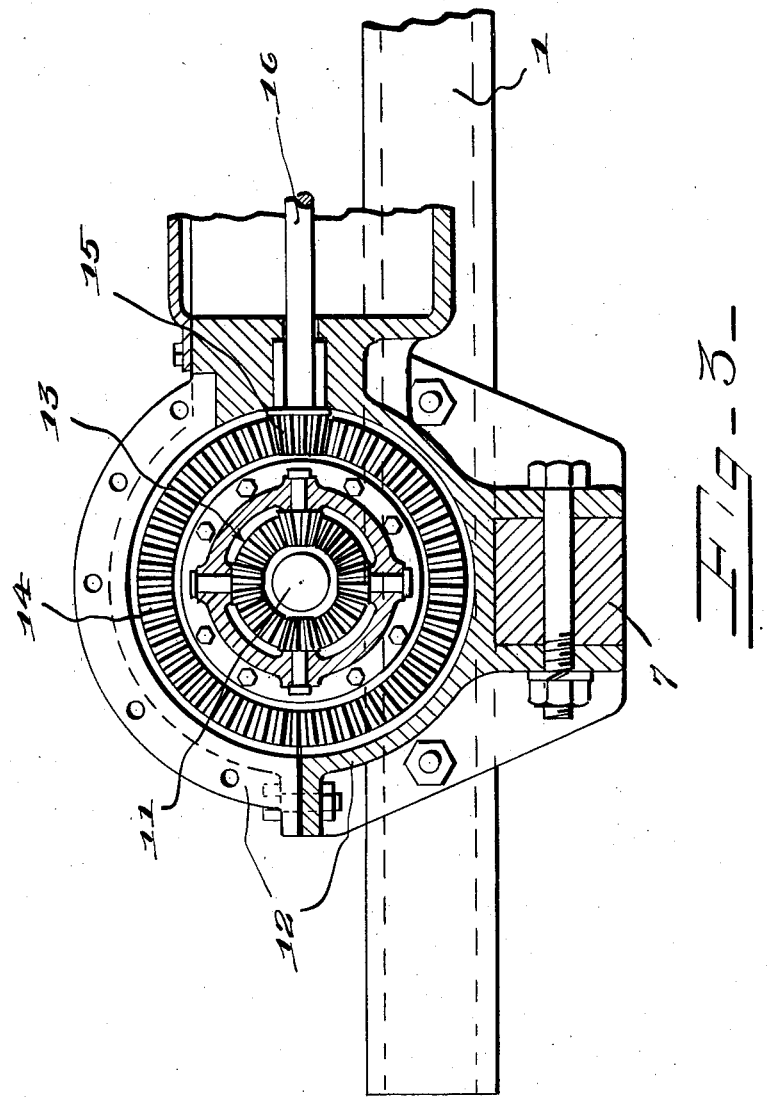

Patented July 16, 1940

2,207,780

UNITED STATES PATENT OFFICE 2,207,780

MOTOR DRIVEN VEHICLE

Charles S. Brown, Syracuse, N. Y.

Application April 1, 1938, Serial No. 199,501

4 Claims. (Cl. 180—70)

This invention relates to motor driven vehicles or machines, as tractors, and has for its object an arrangement of the drive wheels and actuating mechanism or gearing including a differential gearing, by which arrangement a force is applied to the wheels tending to slide or shift the portions of the same on the ground in opposite directions laterally relative to the frame of the machine or in a general axial direction or in a direction transversely of the vehicle, when the driving wheels are obstructed from turning and the drive pinion for the differential tends to travel around the ring gear of the differential and lift the front end of the vehicle or tractor, or to overturn the vehicle backwardly; and hence, the resistance to the shifting or lateral sliding movement of the driving wheels and the over-turning movement is stopped, the engine stalled, or greater resistance created to the backward over-turning force than the force required to turn the wheels.

The invention consists in the novel features and in the combinations and constructions hereinafter set forth and claimed.

In describing this invention, reference is had to the accompanying drawings in which like characters designate corresponding parts in all the views.

Figure 3 is a fragmentary sectional view on line 3—3, Figure 2.

Figure 1:
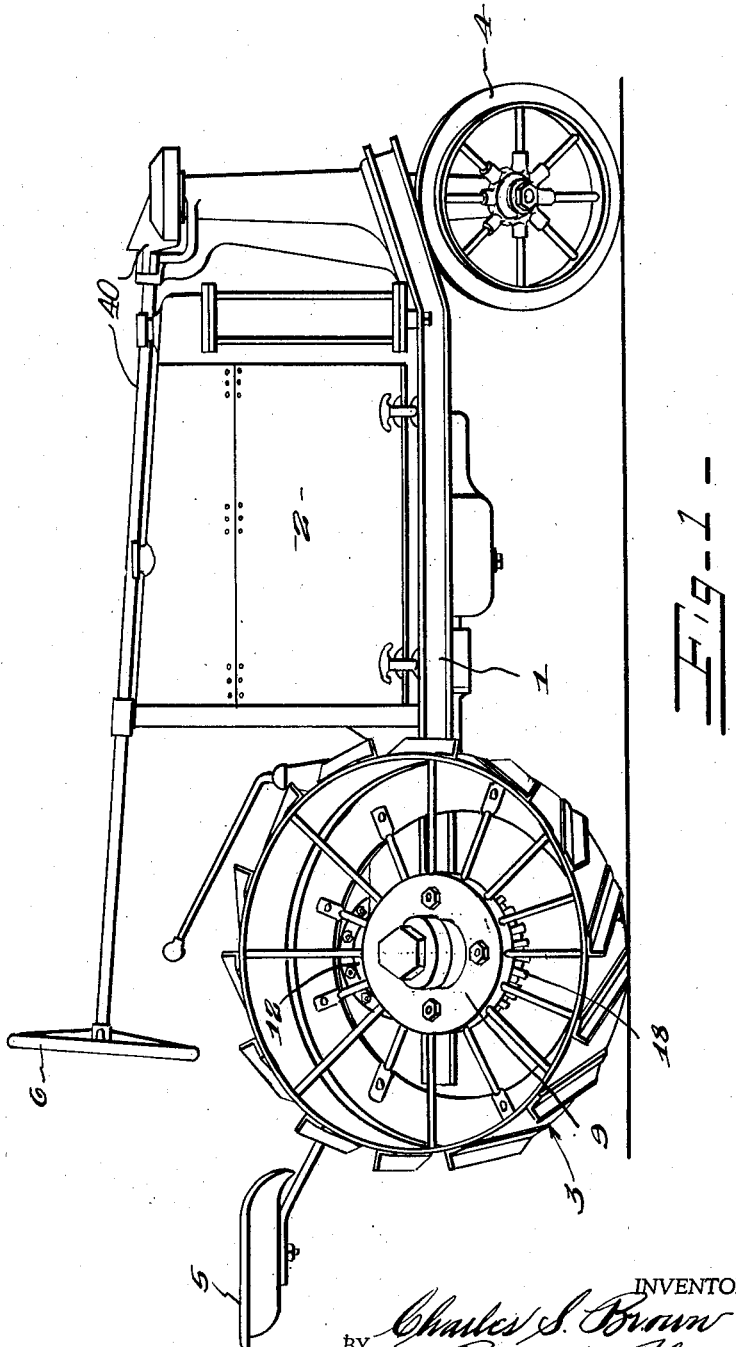
Figure 1 is a side elevation of a tractor embodying this invention.
Figure 2:
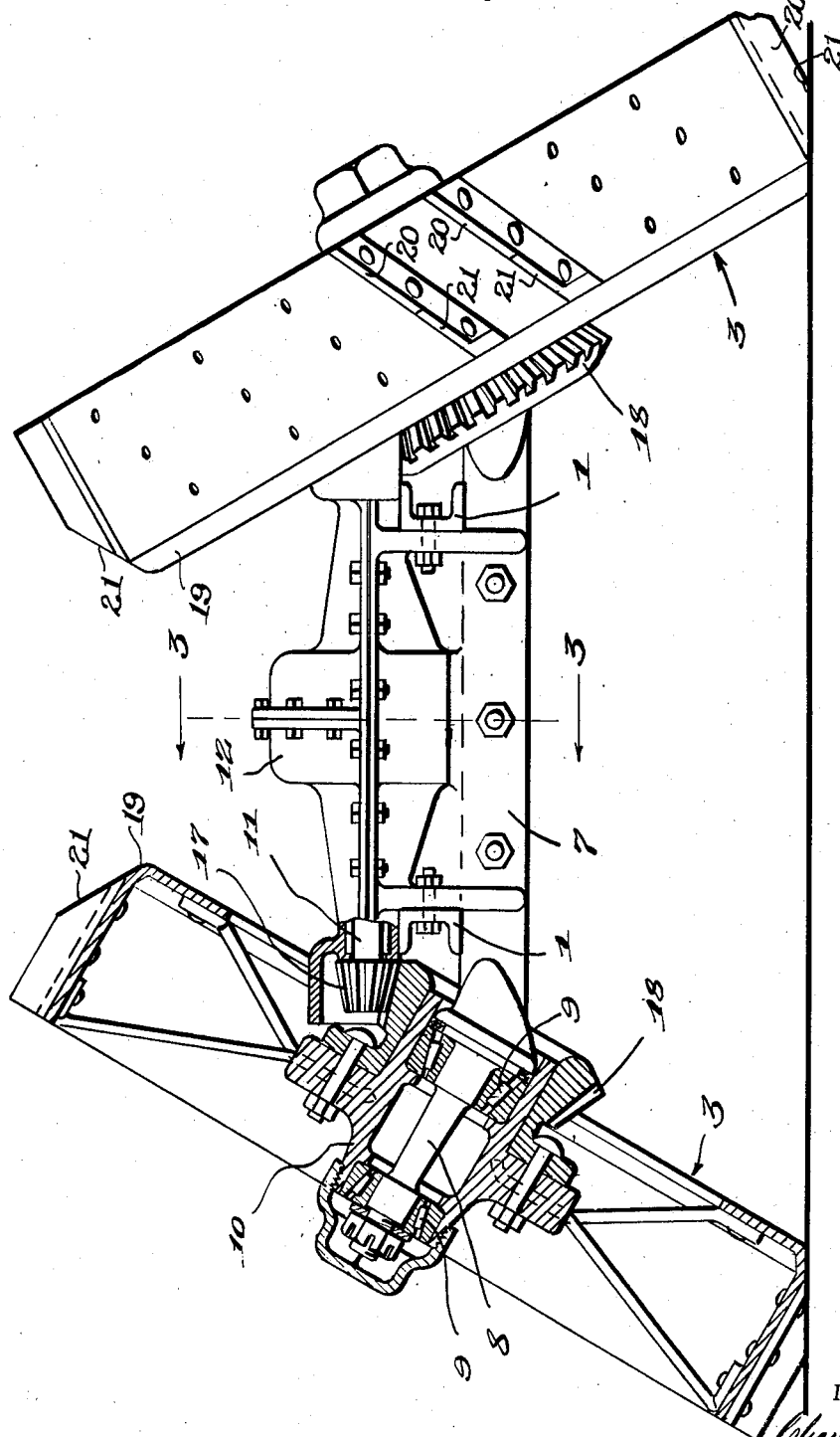
Figure 2 is a rear elevation of the drive wheel axle partly in section and parts being enlarged.

The vehicle or tractor embodying my invention includes a suitable frame, a motor, as an internal combustion engine, on the front part of the frame, driving wheels at the rear end of the frame, a suitable steering wheel at the front end of the frame, the driving wheels being mounted to turn about axes inclined out of a straight transverse line, and actuating mechanism including drive or jack shafts carried by the frame between the rear drive wheels and connected by motion-transmitting means to the wheels, and differential gearing between the drive or jack shafts including a ring gear meshing with the drive pinion actuated by the motor or engine shaft, all of which is such that, when the rotation of the rear wheels is unduly obstructed, and the pinion starts to travel or climb around the ring gear, and hence the frame to turn over backwardly, the turning is obstructed due to the angularity of the axes of the drive wheels, and forces are thus applied to the drive wheels which tend to shift the portions thereof on the ground laterally or toward each other, and hence offer enough resistance to the over-turning movement to either stall the engine or create a balance of power in favor of the drive wheels, causing the drive pinion to turn the ring gear rather than travel or climb around the ring gear.

I designates the frame, which may be of any suitable construction. 2 designates, generally, the internal combustion engine mounted on the forward part of the frame. 3 are the rear drive wheels and 4 designates the front steering wheel or wheels operated from the driver's seat 5 at the rear of the vehicle through a suitable hand wheel 6, and mechanism designated generally 40 operated thereby.

7 designates a rear rigid transverse frame member or bar having angularly extending spindles 8 at its ends rigid therewith. These spindles are inclined radially out of a straight transverse line at a right angle to the direction of travel or out of a horizontal plane and are preferably inclined radially upward in a vertical plane. The drive wheels 3 are rotatably mounted on these axles, and hence rotate in planes converging upwardly. Suitable bearings 9 are interposed between the spindles 8 and the hubs 10 of the wheels.

11 designates the drive or jack shafts extending transversely of the rear portion of the frame adjacent and preferably directly above the transverse bar 7, the jack shafts 11 being mounted in a suitable housing 12 supported from the bar 7. The inner ends of the jack shafts are connected together through a differential gearing 13 of any well-known construction including a ring gear 14 meshing with the bevelled drive pinion 15 on a shaft 16 actuated by the motor, or the crank shaft of the motor, through the usual clutch mechanism and change-speed gearing, not shown. The outer ends of the drive or jack shafts are connected through suitable motion-transmitting mechanism to the wheels 3 respectively, and as here shown, each of the jack shafts is provided with a pinion 17 at its outer end meshing with a gear 18 on the inner side of the adjacent wheels 3 and concentric with the axes of the spindles 8. As the wheels 3 rotate in inclined planes, each gear 18 is bevelled and the corresponding pinion 17 is bevelled.

When the ground wheels 3 encounter an obstruction which prevents the turning of the wheels 3 about the spindles 8, and the driving pinion 15 tends to travel upwardly around the ring gear 14, which is held stationary by reason of the ground wheels being obstructed, the spindles 8 turning with the frame act crank fashion within the hubs of the wheels 3, and hence, as the wheels are held stationary, tend to shift the lower portions of the wheels on the ground toward each other or tend to change the angularity of the plane of rotation of the drive wheels 3. The resistance of the ground to this shifting offers a counter-resistance to the over-turning movement either sufficient to stall the engine or to create a condition where it is easier for the wheels to rotate in case the power is adequate, and hence causes the tractor to travel forwardly rather than to shift their planes of rotation.

The wheels 3 are provided with substantially plane or smooth peripheral conical tread surfaces 19 around their inner margins, so that the peripheral margins adjacent the inner sides of the wheels and the remainder of the treads, which are concentric with the axes of the wheels 3 are provided with sprags or cleats 20, the inner ends of which are inclined or bevelled at 21 and their edges are flush with the conical surfaces 19. By this construction, the tractor can be driven over a road without the sprags digging into the road. When the wheels 3 sink into the earth, the sprags or cleats take hold.

By this arrangement of drive wheels 3 and the differential gear and mechanism actuated thereby, not only is resistance created to backward over-turning sufficient to prevent such over-turning, but the tractor has a greater draw-bar pull for a given weight of tractor than a tractor of the conventional type. Also, the tractor can be considerably shorter than the conventional tractor with the same draw-bar pull. Also due to the incline of thhe drive wheels 3, which gives a sort of side-paddling effect, or an oar push rather than a pole push, each drive wheel 3 tends to push the other into the soil and to take hold or dig in with greater friction rather than lift out of the soil.

What I claim is:

1. In a motor driven vehicle, a frame, drive wheels mounted to rotate about oppositely-inclined laterally-extending axes, and motor actuated mechanism for driving the wheels, each wheel being formed with a peripheral cylindrical tread surface, and a conical tread surface around the margin thereof, the conical surfaces being arranged to engage a road surface and hold the cylindrical surfaces off the road and permit the cylindrical surfaces to sink in the soft earth.

2. In a motor driven vehicle, a frame, drive wheels mounted to rotate about oppositely-inclined laterally-extending axes, and motor actuated mechanism for driving the wheels, each wheel being formed with a peripheral cylindrical tread surface, and a conical tread surface around the margin thereof, the conical surfaces being arranged to engage a road surface and hold the cylindrical surfaces off the road and permit the cylindrical surfaces to sink in the soft earth, and cleats provided on the cylindrical surfaces.

3. In a motor driven vehicle, a frame, drive wheels mounted to rotate about oppositely-inclined laterally-extending axes, and motor actuated mechanism for driving the wheels, each wheel being formed with a peripheral cylindrical tread surface, and a conical tread surface around the margin thereof, the conical surfaces being arranged to engage a road surface and hold the cylindrical surfaces off the road and permit the cylindrical surfaces to sink in the soft earth, and cleats provided on the cylindrical surfaces, the ends of the cleats toward the conical surfaces being inclined so that their edges are flush with the conical surfaces.

4. In a motor driven vehicle including a suitable frame, a motor actuated mechanism comprising drive shafts, a differential gearing between the drive shafts including a ring gear, a drive pinion actuated by the motor and meshing with the ring gear, the combination of wheel spindles rigid with the frame and inclined radially out of a transverse horizontal line, drive wheels rotatably mounted on the inclined spindles, whereby they rotate in inclined planes, and toothed gearing between the drive shafts and the wheels, respectively, including pinions on the drive shafts and gears on the wheels meshing with the pinions, whereby when the drive wheels remain stationary and the drive pinion is actuated and tends to climb the ring gear and rotate the spindles about a transverse axis out of which the spindles are inclined, the spindles tend to change the plane of the stationary drive wheels and restrain the climbing of the drive pinion on the ring gear.

CHARLES S. BROWN.